(12) United States Patent
Oukassi et al.

(10) Patent No.: US 11,362,387 B2
(45) Date of Patent: Jun. 14, 2022

(54) ENERGY STORAGE DEVICE

(71) Applicant: COMMISSARIAT A L'ENERGIE ATOMIQUE ET AUX ENERGIES ALTERNATIVES, Paris (FR)

(72) Inventors: Sami Oukassi, Saint-Egreve (FR); Christophe Dubarry, Claix (FR); Severine Poncet, Voreppe (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 51 days.

(21) Appl. No.: 16/759,114

(22) PCT Filed: Oct. 23, 2018

(86) PCT No.: PCT/EP2018/079052
§ 371 (c)(1),
(2) Date: Apr. 24, 2020

(87) PCT Pub. No.: WO2019/081520
PCT Pub. Date: May 2, 2019

(65) Prior Publication Data
US 2021/0184300 A1    Jun. 17, 2021

(30) Foreign Application Priority Data

Oct. 27, 2017 (FR) ...................................... 17 60163

(51) Int. Cl.
*H01M 50/124* (2021.01)
*H01M 50/159* (2021.01)

(52) U.S. Cl.
CPC ..... *H01M 50/1245* (2021.01); *H01M 50/159* (2021.01)

(58) Field of Classification Search
None
See application file for complete search history.

(56) References Cited

U.S. PATENT DOCUMENTS

| 4,916,035 A | 4/1990 | Yamashita et al. |
| 2001/0032666 A1 | 10/2001 | Jenson et al. |

(Continued)

FOREIGN PATENT DOCUMENTS

FR    2 977 380 A1    1/2013

OTHER PUBLICATIONS

International Search Report dated Dec. 14, 2018 in PCT/EP2018/079052 filed Oct. 23, 2018, 2 pages.

(Continued)

*Primary Examiner* — Alix E Eggerding
(74) *Attorney, Agent, or Firm* — Oblon, McClelland, Maier & Neustadt, L.L.P.

(57) ABSTRACT

An energy storage device includes a substrate having a portion that is optically transparent in a predefined range of wavelengths, and at least one electrochemical energy storage system comprising, as from a face of the transparent portion, a stack having successively a first current collector, a first electrode, an electrolyte, a second electrode and a second current collector, the stack being covered partially by a cover characterised in that wherein at least one part of the cover has a coefficient of light absorbance greater than or equal to 80%, and preferably greater than 90%.

20 Claims, 4 Drawing Sheets

(56) References Cited

U.S. PATENT DOCUMENTS

| | | |
|---|---|---|
| 2001/0033952 A1 | 10/2001 | Jenson et al. |
| 2002/0000034 A1 | 1/2002 | Jenson |
| 2002/0001746 A1 | 1/2002 | Jenson |
| 2002/0001747 A1 | 1/2002 | Jenson et al. |
| 2002/0004167 A1 | 1/2002 | Jenson et al. |
| 2002/0037756 A1 | 3/2002 | Jacobs et al. |
| 2004/0018531 A1 | 9/2004 | Jenson et al. |
| 2004/0185667 A1 | 9/2004 | Jenson |
| 2005/0045223 A1 | 3/2005 | Jenson et al. |
| 2006/0019157 A1 | 1/2006 | Jenson |
| 2006/0021214 A1 | 2/2006 | Jenson et al. |
| 2006/0063074 A1 | 3/2006 | Jenson et al. |
| 2007/0087230 A1 | 4/2007 | Jenson et al. |
| 2007/0243459 A1 | 10/2007 | Jenson et al. |
| 2009/0068556 A1 | 3/2009 | Jacobs et al. |
| 2011/0097609 A1 | 4/2011 | Jenson et al. |
| 2011/0117417 A1* | 5/2011 | Pitts .................. H01M 10/052 429/231.95 |
| 2011/0300413 A1 | 12/2011 | Jacobs et al. |
| 2012/0274273 A1 | 11/2012 | Jacobs et al. |
| 2013/0252088 A1 | 9/2013 | Kuriki et al. |
| 2013/0252089 A1* | 9/2013 | Kuriki .................. H01M 4/74 429/211 |
| 2014/0154401 A1 | 6/2014 | Salot et al. |
| 2015/0280284 A1* | 10/2015 | Shakespeare .......... H01M 6/40 429/162 |

OTHER PUBLICATIONS

Nagai et al., "Synchronous Electrochromism of Lithium Ion Battery With Chemically Fabricated Transparent Thin Films," Functional Materials Letters, vol. 6, No. 2, 2013, pp. 1341001-1 through 1341001-8.

Yang et al. "Transparent lithium-ion batteries," PNAS, vol. 108, No. 32, Aug. 9, 2011, pp. 13013 through 13018.

* cited by examiner

ENERGY STORAGE DEVICE

FIELD OF THE INVENTION

The present invention relates to an electrochemical energy storage device.

The invention finds an advantageous but non-limitative application in the manufacture of microelectronic devices. Microelectronic device means any type of device produced by microelectronic means. These devices encompass in particular, in addition to devices for a purely electronic purpose, micromechanical or electromechanical devices (MEMS, NEMS, etc.) as well as optical or optoelectronic devices (MOEMS, etc.).

A specific interest of the invention is the production of electrochemical energy storage devices. This includes in particular devices of the battery, accumulator or capacitor type using an electrolyte.

TECHNOLOGICAL BACKGROUND

Electrochemical energy storage systems are in general produced by successive depositions on a substrate of a first current collector, a first electrode, an electrolyte or ion conductor, a second electrode and a second current collector. Encapsulation, by means of the deposition of additional layers, or by the transfer of a cap, is often necessary for protecting the system from chemical reactivity with oxygen and water vapour.

The migration of one or more ions between the two electrodes through the electrolyte makes it possible either to store energy or to deliver it to an external circuit.

Innovative and multifunctional electronic devices such as connected objects, in particular in accordance with the trend of the Internet of Things, or objects that can be carried, henceforth often require an energy storage component that can be integrated in the global architecture and fulfil a supplementary structural function, in addition to that of an energy source. One aspect of this integration is the transparency of the support for the energy storage component.

Despite the obvious advantages in having transparent energy storage components, for example for applications such as connected windows, transparent screens or augmented reality spectacles, the production and characterisation of such components still appear to be little developed, and the prior art can be classified into two categories, according to the approach adopted for providing a degree of transparency of the component.

In a first case, the energy storage component is formed with intrinsically transparent materials. In this case, the storage component, often a battery or capacitor, consists of a stack of materials that all have intrinsic transparency. It may also be a case of very thin materials so as to minimise the total opacity of the component.

This type of component has the drawback of poor overall energy storage performance. This is because the thicknesses are often small in order to optimise the total transparency, and thus limit the volume of material used for storage (insertion electrodes) or have a lower intrinsic storage capacity than that obtained by conventional, less transparent, materials.

Another method currently being explored is a component architecture integrating opaque materials structured in a grid on the supporting substrate. In this case, a degree of transparency is obtained by the structuring of conventional materials in the form of a grid. The form of the grid makes it possible to modulate the global transparency of the component, while selecting conventional materials with high electrochemical performance, irrespective of their optical properties. This approach also makes it possible to decorrelate the transparency and the storage capacity of the components, since the increase in thickness of the electrode makes it possible to increase the storage capacity without modifying the opening ratio of the grid (the ratio of surface area of opaque materials to transparent surface area) and consequently the transparency.

This type of component does however have a drawback: increasing the thicknesses of electrodes causes a degradation in the optical properties, which considerably limits the decorrelation between optical and electrochemical properties.

The patent publication US 2013/0252089 A1 discloses an energy storage device formed in a lattice on a support. It comprises a stack of layers forming a capacitive assembly, the stack comprising a sealing layer covering the other layers and able to have a light-absorption character. This attempt at limiting stray light effects is however not optimal.

There therefore currently exists a need for devices comprising electrochemical energy storage components carried by a transparent substrate and having sufficient efficiency without prohibitively impacting on the transparency of the substrate. One object of the invention is to at least partly overcome the drawbacks of current techniques in order to achieve this.

SUMMARY OF THE INVENTION

A non-limitative aspect of the invention relates to an energy storage device comprising a substrate having a portion that is optically transparent in a predefined range of wavelengths, and at least one electrochemical energy storage system comprising, as from a face of the transparent portion, a stack having successively a first current collector, a first electrode, an electrolyte, a second electrode and a second current collector, the stack being covered at least partially with a cover. Advantageously, at least part of the cover has a coefficient of light absorbance greater than or equal to 80%, preferably greater than 90%.

Furthermore, preferably, the cover covers, preferentially completely, the top surface (that is to say the face thereof opposite to the substrate) of the second current collector.

Thus part of the light directed towards the substrate is absorbed by the storage system. Whereas it might have been thought that this feature is unfavourable, since the light transmission through the complete device could be impacted, the applicant found that this absorption affords an increase in temperature of the storage system, which favours the efficiency thereof, while optimising ionic and/or electrochemical exchanges in the stack. This also reduces the transmission of diffuse light through the device, consequently increasing the optical contrast.

In addition, this absorption is advantageously limited to the region corresponding to the second collector, and the sides of the stack are not covered. This avoids increasing the width of the complete storage system in contact with the substrate in order to preserve a large opening of the substrate, and therefore promoting transparency. Nevertheless, the cover remains effective in that it captures the majority of the heat issuing from the impact light in the storage system and in that the exchange surface area that it procures with the capacitive stack is large. The cover is moreover concentrated at an interface with the stack, which is generally a good heat conductor, being the second current collector.

Whereas the document US 2013/0252089 A1 proposes a complete covering of the capacitive stack, which may appear more effective, one aspect of the present invention combats this prejudice by limiting the absorbent cover to a selected region of covering of the capacitive stack. Furthermore, surprisingly, not covering the sides of the capacitive stack avoids the effect of stray light that may occur when incident light on a part of the side of a cover diffuses therein. On the contrary, the cover of this embodiment of the present invention is not liable to create its brightness defects in the vicinity of or at the interface between the base of the capacitive stack and the substrate.

Another separable aspect of the present invention relates to a method for manufacturing a device.

Another separable aspect of the invention relates to an energy storage device comprising a substrate having a portion that is optically transparent in a predefined range of wavelengths, and at least one electrochemical energy storage system comprising, as from a face of the transparent portion, a stack having successively a first current collector, a first electrode, an electrolyte, a second electrode and a second current collector. Advantageously, the storage system has, in a dimension perpendicular to the thickness of the substrate, a width decreasing away from the face of the substrate.

By virtue of this aspect, there are provided firstly a limitation of the shading and thus optimum transmission in a greater angular range (device/observer), and secondly a reduction in the phenomena of diffusion and diffraction of light.

In the non-limitative case of the combination of the aspect of the invention related to the cover and the aspect related to the decreasing width, the sides of the system are advantageously covered with the cover and thus form a large surface area for the recovery of energy by optical absorption, so as to heat the stack of layers of the electrochemical storage system.

BRIEF INTRODUCTION OF THE FIGURES

Other features, aims and advantages of the present invention will emerge from a reading of the following detailed description with regard to the accompanying drawings, given by way of non-limitative examples and on which.

The drawings are given by way of examples and are not limitative of the invention.

They constitute schematic outline representations intended to facilitate understanding of the invention and are not necessarily to the scale of practical applications. In particular, the relative thicknesses of the layers do not represent reality.

DETAILED DESCRIPTION

Before beginning a detailed review of embodiments of the invention, optional features that may possibly be used in accordance with any association or alternatively are stated below:

the at least one part of the cover 30 comprises at least one layer of an oxide or of a metal nitride or of an oxide or nitride of a semiconductor material, preferably silicon, or amorphous silicon;

the at least one part of the cover 30 has a textured exposed surface configured to increase the absorbance of light;

the textured exposed surface comprises patterns in relief;

the textured exposed surface comprises an RMS roughness greater than or equal to 100 nm;

the at least one part of the cover 30 comprises a non-reflecting surface coating;

the at least one part of the cover 30 covers the whole of the stack 29; this means that all the superimposed layers are covered at the face of the substrate 10, limiting any non-covered parts to the portions of collectors whose exposure may be useful for contact reconnection by the face of the substrate 10 (a contact connection by the opposite face of the substrate, for example with vias, is also possible);

the stack 29 comprises an encapsulation layer 27 configured to encapsulate the stack in a watertight and/or airtight manner, the encapsulation layer being surmounted by the cover 30;

the cover 30 is configured to encapsulate the stack (29) in a watertight and/or airtight manner;

the cover 30 has a thickness greater than the longest wavelength in the predefined range of wavelengths;

the storage system 20 has, in a dimension perpendicular to the thickness of the substrate 10, a width that decreases away from the face of the substrate 10;

the decreasing width defines two rectilinear sides the slope of which is strictly greater than 0° and less than or equal to 45° in relation to the io thickness of the substrate 10;

the storage system 20 has a width, at the face of the substrate 10, of between 5 and 50 microns and/or a height of between 5 and 50 microns;

the stack 29 has sides directed along the thickness of the substrate 10 and wherein the decreasing width is conferred by the cover 30;

the decreasing width is conferred by the stack 29, the cover 20 being conforming above the stack 29;

the predefined range of wavelengths is between 200 and 2000 nm, and is preferably included in the visible spectrum;

preferably the cover 30 does not comprise any fillers absorbing light in its mass, and in particular does not include any black pigment;

preferably, the top surface of the stack 29 is planar, and preferably parallel to the face of the transparent portion of the substrate 10; in particular the top surface of the second collector 26 can make it possible to define this planar part;

advantageously, the first collector, the first electrode, the electrolyte, the second electrode and the second collector all have a planar top surface and preferably one parallel to the face of the transparent portion of the substrate 10;

preferably only the electrolyte covers the underlying layers; the second electrode and the second collector do not have any portion covering the sides of the stack in this case; equally, it is possible for the first electrode and the first collector not to have any portion covering an underlying layer; in a preferred embodiment, the various components of the stack are layers parallel to the face of the transparent portion of the substrate 10 placed one above the other are lateral coverings, apart, preferably, with regard to the electrolyte; in this way the lateral size of the storage system is limited; any lateral covering by the electrolyte, at the sides of the stack, optionally makes it possible to thermally insulate the most central part of the stack, the material of the electrolyte preferably being a good heat insulator;

advantageously, the electrolyte is configured to fully cover the first to electrode and the first current collector;

optionally, the stack 29 is covered with an encapsulation portion, for example based on at least one layer, preferably fully covering the stack 29; the cover 30 may be situated above the encapsulation portion in this case, or below.

It is stated that, in the context of the present invention, the term "on" or "above" does not necessarily mean "in contact with". Thus, for example, the deposition of a layer on another layer does not necessarily mean that the two layers are directly in contact with one another but means that one of the layers at least partially covers the other while being either directly in contact therewith or being separated therefrom by a film, or another layer or another element. A layer may moreover be composed of a plurality of sublayers of the same material or of different materials.

It is stated that, in the context of the present invention, the thickness of a layer or of the substrate is measured in a direction perpendicular to the surface along which this layer or substrate has its maximum extension.

Within the meaning of the present application, the term collector means in particular a part of the device the function of which is to connect an electrode to an element external to the device, that is to say situated outside the stack of layers of the device, generally encapsulated. The term electrode means in particular, for its part, a part of the device in electrical continuity with an active layer (in particular an electrolyte, preferably solid, forming a solid conductor of ions). The current collector is connected to its electrode so as to establish electrical continuity between these two parts; the latter may also come from one or more common layers of materials; in this case, the collector will generally form a protrusion on the electrode, towards the outside of the encapsulated device.

The invention is based on a substrate 10 at least one portion of which is transparent along the thickness thereof. It is not necessary for the whole of the substrate 10 to be transparent; for example, it may have a non-transparent peripheral frame and a transparent inner volume, as is the case with a window. Transparency means the optical property of a volume to transmit light in a given direction, for a given wavelength or a range of wavelengths without excessive losses, by absorption or reflection. A transmission ratio of at least 80% is considered to be acceptable for justifying the transparency of an object.

Figure 1:
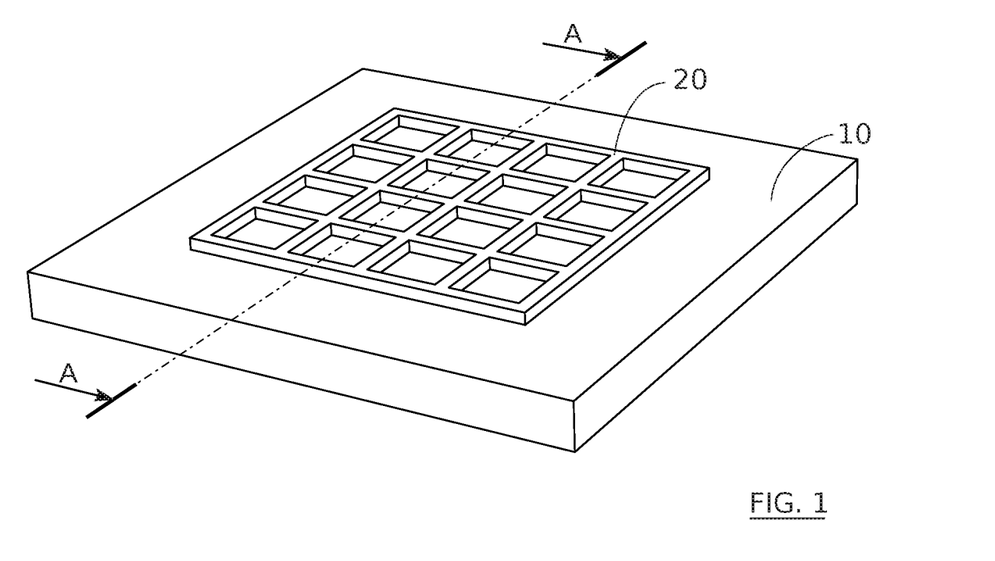
FIG. 1 illustrates in perspective an energy storage device provided with a system organised in a grid on a substrate.

FIG. 1 gives an illustration, in perspective, of a substrate 10 in the form of a transparent plate equipped with an energy storage system organised in the is form of a grid and which is not, generally in the invention, transparent; in general, the stack used according to the invention has a thickness such that the storage system is even completely opaque. The degree of opening of the grid determines the degree of transparency of the whole.

In general terms, the optical properties discussed in the invention lie in the useful wavelength range, that is to say relevant for the application. The term predefined range of wavelengths corresponds to this range, it being understood that the range may consist of a single value, for example for treating monochromatic light. In general terms, the range of wavelengths may be between 200 and 2000 nanometres. In the majority of applications, the range of wavelengths will be included in the visible spectrum, that is to say in the range of wavelengths detectable by the human eye, which can correspond to the range between 380 and 780 nanometres.

In general terms, the storage system 20, an example of which is visible in FIG. 1, comprises a stack of layers making it possible to implement the various components of an electrochemical storage device, comprising a stack itself comprising a first collector, a first electrode, an electrolyte, a second electrode and a second collector. The electrolyte is a portion interposed between the two separate conductive portions consisting respectively of the first collector and the first electrode, and of the second electrode of the second collector. Exchanges of ions between these two conductive portions take place through the electrolyte, in accordance with the principle of electrochemical energy storage.

One aspect of the function of such devices is that the efficiency increases with temperature. To this end, one aspect of the invention relates to the absorption of part of the light by the storage system 20, an adsorption that will increase the temperature in this system 20. In general terms, this absorption of light is permitted by means of a cover part 30, geometric examples of which will be given below. The cover 30 is configured to cover at least part of the exposed surface of the stack 29, and advantageously the whole of this stack. The cover 30 can however be limited to the covering of a top face of the stack 29, in particular above the second collector, without covering the sides of the stack 29, namely the parts directed essentially along the thickness dimension of the substrate 10 and of the stack 29. According to another option, on the contrary only the part of the flanks is covered, without covering the top face of the stack. Obviously the efficacy in terms of light absorption will be greater in the case of a complete cover, which is the preferred case.

In the following examples of an embodiment of the device of the invention and of various configurations of the storage system, the cover 30 is in a single piece, from a single layer manufacturing phase. This example is not imitative of the invention. In particular, the cover 30 may itself consist of a plurality of sublayers manufactured successively.

Since the cover 30 is intended to increase the absorption of light of the storage system 20, its coefficient of absorption will advantageously be chosen, in the range of wavelengths in question, to be greater than that or those of the layer or layers forming the exposed surface of the stack that the cover 30 covers.

Advantageously, the coefficient of absorption is chosen to be greater than or equal to 80%. More preferentially, it is chosen to be greater than or equal to 90%.

According to one possibility, materials are used in the form of oxides or metal nitrides (for example tantalum nitride) or in the form of oxides or nitrides of a semiconductor material (preferably silicon) or amorphous silicon in order to form all or part of the cover 30.

Preferably, the thickness of the cover is greater than the longest wavelength of the predefined range of wavelengths.

To achieve the required optical absorption level, another option of the invention is to select a surface state for the exposed surface of the cover 30. It is in particular possible to increase the roughness of this surface by chemical or physical etching. By way of example, it can be ensured that the RMS roughness obtained is greater than or equal to 100 nm.

Alternatively or cumulatively, it is also possible to form patterns on the surface of the cover 30. In order to produce textured surfaces having reliefs, for example pyramidal in shape, the following technique is known: the production of a so-called "inverted pyramid" structure produced by chemical etching after a lithography step.

The invention also does not make any assumption on the geometry of the texture produced. The form of reliefs may form pyramids, and therefore having in cross section a triangular cross section, regularly spaced apart, without this in any way limiting the application of the invention to any other type of texturing.

The reliefs could just as well have forms with a polygonal or circular cross section. The reliefs may also have curved forms. They may in particular be undulations on the surface of the cover.

Furthermore, the space between two patterns is not necessarily constant. Moreover, the reliefs may have varied forms.

Non-limitatively, the amplitude of the relief produced by the texturing will typically be between around a hundred nanometres and several tens of microns (1 micron=$10^{-6}$ metres) and more particularly between 1 and 25 microns for the application. In general terms the amplitude of a relief is defined as the distance between its highest point and its lowest point. This distance is taken in a direction approximately normal to the surface of the cover.

The size of the base of the reliefs is also potentially between 3 and 25 microns and more particularly between 4 and 15 microns. The size of the base of the reliefs corresponds to the maximum dimension of the relief taken at its portion forming a projection with respect to the surface of the cover taken between two reliefs.

The pitch of a textured surface corresponds to the mean distance between two consecutive reliefs. For example, the pitch of the textured surface is between 2 and 20 microns and more particularly between 4 and 15 microns. For example, for a pitch of 9 μm, reliefs in the form of an inverted pyramid are 6 μm deep and, for a pitch of 15 μm, they are 10 μm deep. Typically the pitches are measured between two pyramid vertices.

An example is given below of the manufacture of one or more energy storage systems or components on a substrate, with reference to FIGS. 2a to 2f. These figures are partial cross sections oriented along a plane directed across the thickness of the substrate and containing the line A-A in FIG. 1. This being the case, no consistency in dimensional proportions between FIG. 1 and FIGS. 2a to 2f has been sought.

The storage system 20 is produced on a substrate 10, which may be glass, with a thickness for example of between 0.5 mm and 1.5 mm. The first potential step is a relief of the stresses in the glass, carried out by means of annealing at 600° C. for two hours. This step will enable the glass not to expand during future annealings; this corresponds to the step in FIG. 2a.

The second step consists of depositing, in particular by PVD (the acronym for physical vapour deposition), the first collector, which is in the case illustrated a dual layer composed of a first layer 21 (for example 50 nm of Ti) and a second layer 22 (for example 250 nm of Pt). The forming may be carried out by photolithography, by means of which a suitable design is transferred to the layers, and by wet etching, by means of which the materials are etched one after the other: the etching of the Pt is carried out for example in a bath of $HNO_3/HCl$ at 57° C., with an etching speed of around 25 nm/min.

Figure 2A:
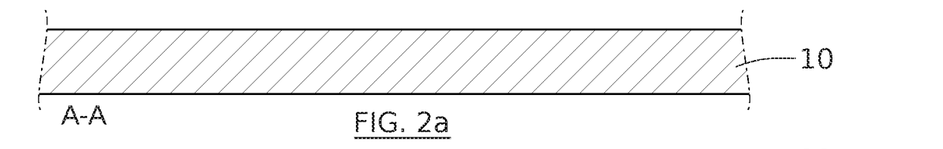
FIGS. 2a to 2f present successive steps of a non-limitative embodiment of a device of the invention.
Figure 2B:
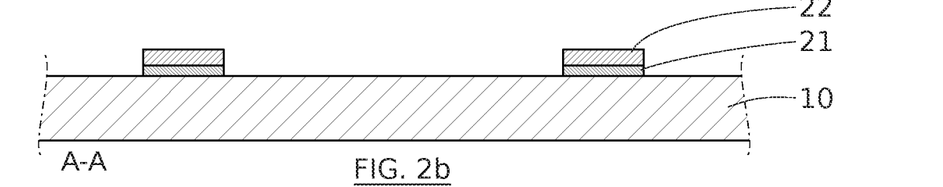

As for the etching of the Ti, this is carried out for example with a bath of $NH_3/H_2SO_4/H_2O_2/H_2O$ (1/1/1/1), with an etching speed of approximately 50 nm/min, the configuration illustrated in FIG. 2b is reached.

The following step is the deposition of the first electrode 23, generally the positive electrode, which may be LICO (the contraction of the term lithium-cobalt), and which can be deposited by PVD, in order to obtain a layer thickness in particular of between 3 μm and 20 μm.

In the same way as for the collector, a photolithography step and a wet etching step produce the patterns, aligned with respect to the patterns of the s first collector 21, 22.

Figure 2C:
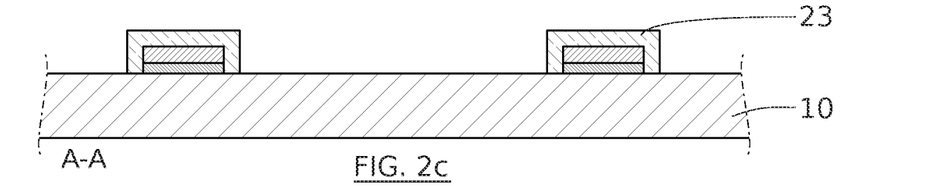

The etching is done for example in a bath of $H_2SO_4/H_2O_2/H_2O$ (1/5/32), the etching speed being around 6 μm/min. Annealing at 600° C. for two hours completes the production of the first electrode 23. The result in FIG. 2c is arrived at.

Figure 2D:
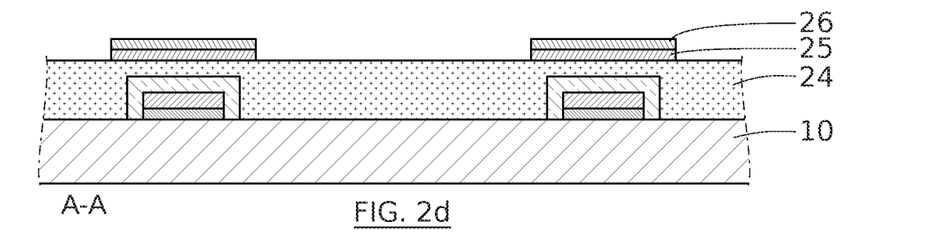

By PVD deposition, the electrolyte 24, preferably LiPON, and the negative electrode 25, for example made from silicon, and the second collector 26 made from Ti, will be deposited successively. The electrode 25 and the second collector 26 can be formed at this stage. For example, photolithography will locate the future patterns of these parts, which will be created then by a plasma, in particular $Ar/O_2/CHF_3$, at a pressure of 40 t, at an RF power of 280 W and an LF power of 400 W (etching speed of around 0.7 nm/min). FIG. 2d gives a result thereof.

Figure 2E:
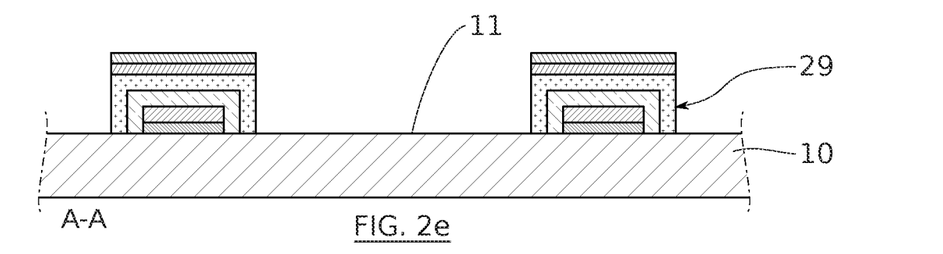

The following step is the etching of the material of the electrolyte 24, carried out in the case of the LiPON in a bath of TMAH (tetramethyl ammonium hydroxide) after development of photoresin, with an etching speed of approximately 2 μm/min. The configuration in FIG. 2 is obtained where the stack 29, consisting successively of the first collector, the first electrode, the electrolyte, the second electrode and the second collector, is finalised.

The face 11 of the substrate 10 remains exposed outside the regions of the stack 29.

In a first case, the cover 30 is then formed directly. This can take place by means of a step of deposition of a layer of amorphous silicon. As indicated previously, this layer can be textured so as to increase the optical absorption level. An example of a cover 30 is given in FIG. 2f.

Figure 2F:
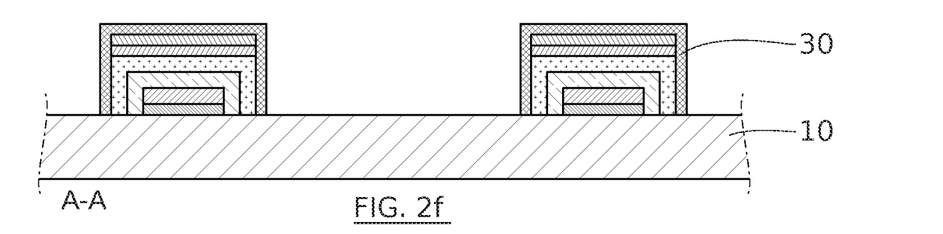

According to one possibility that is not illustrated in FIG. 2f, an encapsulation layer is formed in advance around the stack 29, at this side of the cover 30.

According to another possibility that is not illustrated, the cover 30 comprises a non-reflecting layer; it may be a surface coating consisting of or comprising one or more dielectric materials, for example an $SiO_2/Si_3N_4$ multilayer.

One aspect of the invention that is separable from the other aspects is the optimisation of the passage of light in the regions of the substrate 10 that are not occupied by the storage system.

Figure 3:
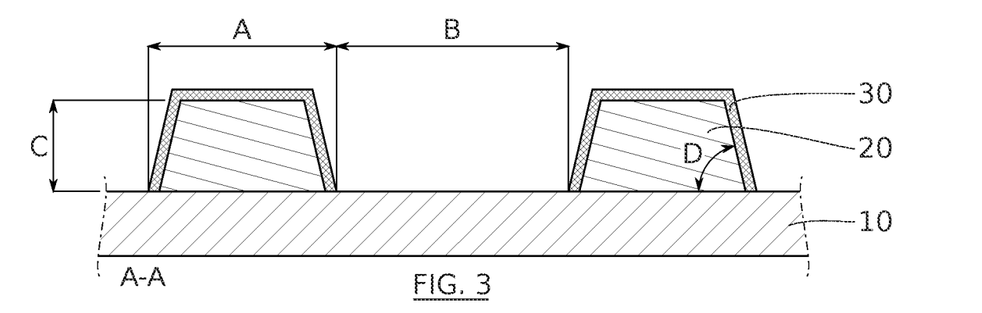
FIGS. 3 to 5 show possible alternative configurations of the energy storage system.
Figure 4:
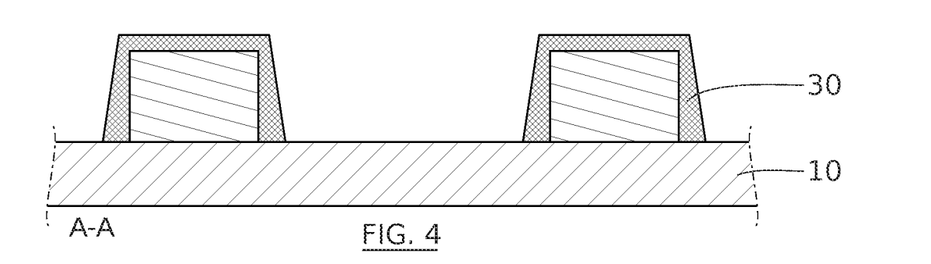
Figure 5:
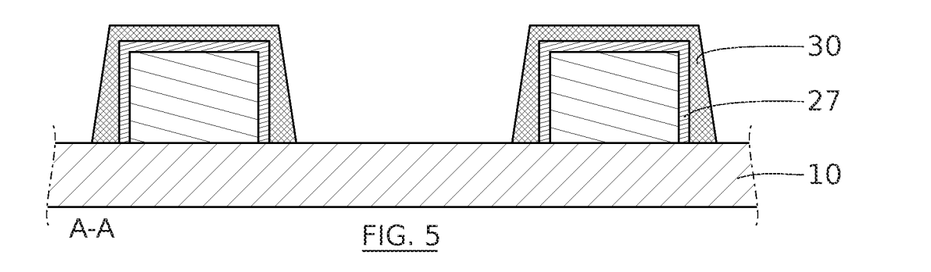

FIGS. 3 to 5 give three non-limitative embodiments of configurations suitable for this purpose.

In general terms, the storage system forms on the substrate an array that must preserve transparency and forms a grid for the storage of energy in association with a transparent part (of the substrate 10) where it is advantageous to optimise direct optical transmission. The invention takes into account dimensions of non-transparent elements in order to apprehend the optical phenomena such as diffusion, diffraction and angular effects. This is because, the thicker the structure—in order to increase the storage capacity of the component—the greater the optical effects.

The definition of a few optical concepts cited previously are stated below:

optical diffraction: The diffraction of light is the phenomenon by which the light rays coming from a point source are diverted from their rectilinear path when they skim the edges of an opaque obstacle. This optical phenomenon, affecting the observation of an image through an instrument, is due to the wave character of light.

In the case of significant diffraction, the transmitted part of the light is reduced, and the transparency of the component is consequently lower.

optical diffusion: Diffusion is the phenomenon by means of which radiation, such as light, is diverted in various directions by an interaction with other objects. The diffusion may be isotropic, that is to say uniformly distributed in all directions, or anisotropic.

In the case of a wide-angle diffusion, the light is diffused uniformly in all directions. This causes attenuation of contrast and an image of cloudy dull appearance.

In the case of a narrow-angle diffusion, the light is diffused in a narrow angle with a high concentration. This effect very well describes how very fine details can be seen through the sample. The quality of the clarity is in general not impaired, only the transparency of the component is reduced in this case.

One solution proposed for remedying this problem consists of forming a storage system having, in cross sectional planes comprising the direction in thickness of the stack 29, a decrease in width away from the substrate 10. The width dimension means a dimension perpendicular to the thickness and preferably perpendicular to a longitudinal direction along which the largest dimension of a given portion of the system extends.

It is possible in particular to generate trapezoidal structures. These shapes allow firstly limitation of shading and thus optimum transmission in a larger angular range (device/observer) and secondly a reduction in the phenomena of diffusion and diffraction of light.

In the case where the storage system has straight sides directed across the thickness of the stack 29, the top corners of this assembly form not insignificant obstacles to the light, when the latter is inclined relative to the direction of the thickness of the substrate. On the other hand, with a structure such as the one illustrated in FIG. 3, the light flow passing through the complete structure of the device (and therefore the transmittance or the degree of transparency obtained) is greater, since the interaction of the incident light (non-normal, having an angle) with the surface of the electrochemical storage system is reduced.

In the case in FIG. 3, the cross section of the storage system comprises a base in contact with the face 11 of the substrate 10, a top face, preferably planar and parallel to the face 11 of the substrate 10, said face having a width dimension less than that of the base, and two sides joining the base and the top face. In this example, the sides are straight and inclined. Advantageously, the inclination of the sides is equivalent so as to form a system having axial symmetry, in the thickness direction of the stack 29. The formation can be carried out directly at the stack 29 as is the case in FIG. 3. In this situation, the cover is advantageously conforming, that is to say covering the structuring of the active level without modifying it.

According to the alternative possibility in FIG. 4, it is the form of the cover 30 that determines the form of the overall enclosure of the storage system. As in the previous case, it is possible to obtain a trapezoidal shape with a base, a top face and two sides. In order to obtain this structure, control of the slope is advantageously achieved by transfer of patterns of a photoresin: resin patterns themselves having slopes are produced on top of the storage system. The selectivity of etching (ratio of resin etching speed to speed of etching absorbent material of the covering layer 30) makes it possible to control the slope: a selectivity of 1 makes it possible to transfer the same slope as the one generated in the resin. It will be understood from FIG. 4 that the thickness of the cover 30 may be homogeneous in its horizontal extension on top of the stack 29. On the other hand, this thickness increases gradually in the direction of the face 11 of the substrate 10 so as to produce the slope.

By way of example, the slope is advantageously greater than 0° and less than or equal to 45° relative to the thickness direction of the substrate.

According to a separable aspect of the invention, the cover 30 has both optical absorption characteristics and characteristics of airtightness and/or watertightness making it possible to encapsulate the stack 29. In this context, the cover 30 may be disposed directly on top of the second collector. According to another possibility, the stack of the storage system comprises, underlying the cover 30, an encapsulation layer 27. The latter layer preferably covers the whole of the surface of the stack 29. This is the case in FIG. 5.

With reference of FIG. 3, non-limitative examples of sizing and spacing are given for the parts of the storage system 29. The dimension A corresponding to the width dimension of a stack pattern 29 may be between 5 and 50 microns. The spacing B between two stack patterns may be between 5 and 50 microns. The height C of the storage system may be between 5 and 50 microns. The angle D formed between the plane of the substrate and the side of the stack may be between 45 and 90 degrees.

Figure 6A:
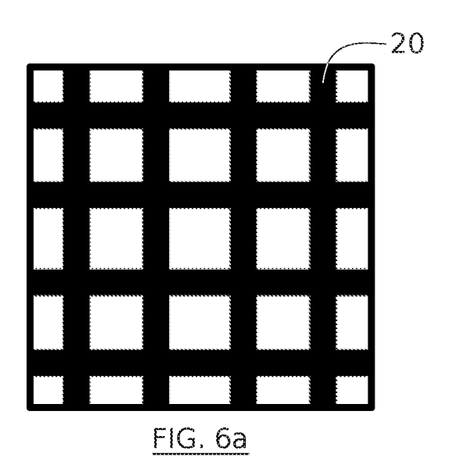
FIGS. 6a to 6d present four examples of distribution of the energy storage system on the face of a substrate.
Figure 6B:
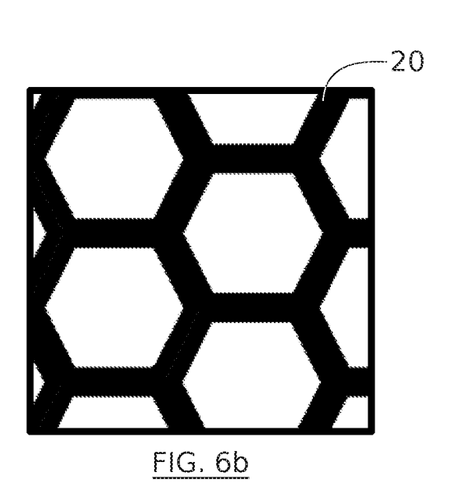
Figure 6C:
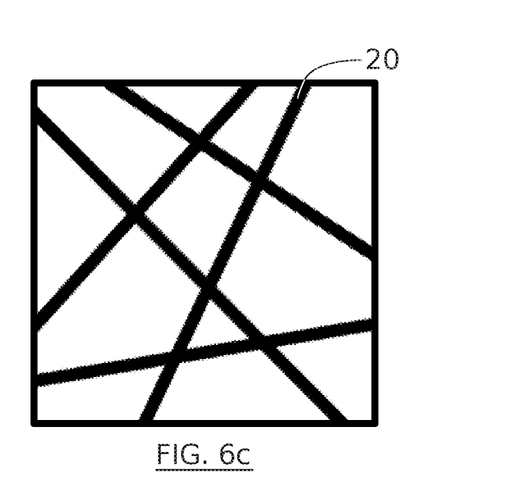
Figure 6D:
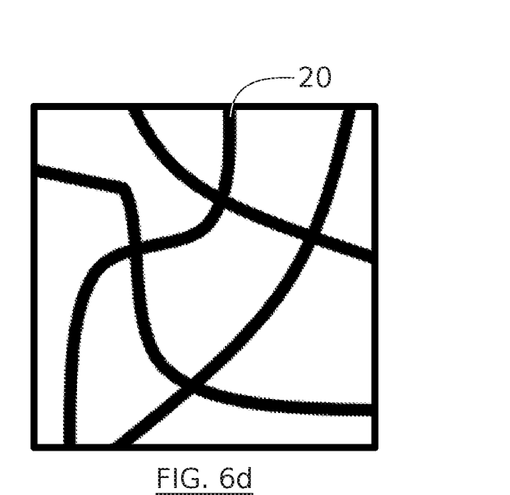

The storage system thus proposed may be in the form of a mesh on the face of the substrate 10 with a regular shape as is the case in FIG. 1 and FIG. 6a, the mesh being in the form of a grid delimiting alveoli for the passage of light with a rectangular and preferably square cross section. FIG. 6b gives an alternative in which the grid comprises hexagonal alveoli. In the case in FIG. 6c, the grid comprises a plurality of straight lines having different directions and comprising intersections. Another possibility is given in FIG. 6d, for which, unlike FIG. 6c, the grid comprises a plurality of curved lines extending so as to form intersections.

In the cases illustrated, the electrochemical storage system forms a lattice of portions comprising the stack 29 and extending at a face 11 of the substrate 10. This face of the substrate 10 may receive a plurality of such lattices, namely a plurality of grids separated from each other so as to form a plurality of electrochemical storage systems. Furthermore, it is possible to form one or more other systems on the other face of the substrate 10.

Unless specifically indicated to the contrary, technical features described in detail for a given embodiment may be combined with technical features described in the context of other embodiments described by way of is non-limitative example, including those explained in detail above.

The invention claimed is:
1. An energy storage device, comprising
 a substrate having a portion that is optically transparent in a predefined range of wavelengths included in the visible range, and
 at least one electrochemical energy storage system comprising a cover and, as from a face of the transparent portion, a stack having successively a first current collector, a first electrode, an electrolyte, a second electrode and a second current collector, the stack having a top surface formed by a top surface of the second current collector and side surfaces and being covered by the cover, wherein at least part of the cover comprises, in the predefined range of wavelengths, a coefficient of light absorbance greater than a coefficient of light absorbance of the second current collector, and the stack is covered by the cover solely above the top surface of the second current collector, the top surface of the second current collector being planar.

2. The device according to claim 1, wherein the at least one part of the cover comprises at least one layer of a metal oxide or nitride.

3. The device according to claim 1, wherein the at least one part of the cover has a textured exposed surface configured to increase the light absorbance.

4. The device according to claim 3, wherein the textured exposed surface comprises patterns in relief.

5. The device according to claim 3, wherein the textured exposed surface comprises an RMS roughness greater than or equal to 100 nm.

6. The device according to claim 1, wherein the at least one part of the cover comprises a non-reflecting surface coating.

7. The device according to claim 1, wherein the electrolyte is configured to fully cover the first electrode and the first current collector.

8. The device according to claim 1, wherein the coefficient of light absorbance of the at least part of the cover is at least 80%.

9. The device according to claim 1, wherein the coefficient of light absorbance of the at least part of the cover is at least 90%.

10. The device according to claim 1, wherein the storage system has, in a dimension perpendicular to a thickness of the substrate, a width that decreases away from the face of the substrate.

11. The device according to claim 10, wherein the decreasing width defines two rectilinear sides, a slope of which is strictly greater than 0° and less than or equal to 45° relative to a direction along the thickness of the substrate.

12. The device according to claim 1, wherein the storage system has a width, at the face of the substrate, of between 5 and 50 microns and/or a height of between 5 and 50 microns.

13. The device according to claim 1, wherein the top surface of the second current collector is parallel to the face of the transparent portion.

14. The device according to claim 1, wherein the cover does not contain any light-absorbing filler or any black pigment.

15. The device according to claim 1, wherein the at least one part of the cover comprises at least one layer of an oxide or nitride of a semiconductor material.

16. The device according to claim 1, wherein the at least one part of the cover comprises at least one layer of amorphous silicon.

17. The device according to claim 1, wherein the at least one electrochemical energy storage system is formed in a grid.

18. An energy storage device, comprising
a substrate having a portion that is optically transparent in a predefined range of wavelengths included in the visible range, and
at least one electrochemical energy storage system comprising a cover and, as from a face of the transparent portion, a stack having successively a first current collector, a first electrode, an electrolyte, a second electrode and a second current collector, the stack being covered by the cover, wherein
at least part of the cover comprises, in the predefined range of wavelengths, a coefficient of light absorbance greater than a coefficient of light absorbance of the second current collector, and the stack is covered by the cover solely above a top surface of the second current collector, and
the at least one part of the cover has a textured exposed surface configured to increase the light absorbance.

19. The device according to claim 18, wherein the textured exposed surface comprises patterns in relief.

20. The device according to claim 18, wherein the textured exposed surface comprises an RMS roughness greater than or equal to 100 nm.

* * * * *